US011430218B2

(12) United States Patent
Li et al.

(10) Patent No.: US 11,430,218 B2
(45) Date of Patent: Aug. 30, 2022

(54) USING A BIRD'S EYE VIEW FEATURE MAP, AUGMENTED WITH SEMANTIC INFORMATION, TO DETECT AN OBJECT IN AN ENVIRONMENT

(71) Applicant: Toyota Research Institute, Inc., Los Altos, CA (US)

(72) Inventors: Jie Li, Los Altos, CA (US); Rares A. Ambrus, San Francisco, CA (US); Vitor Guizilini, Santa Clara, CA (US); Adrien David Gaidon, Mountain View, CA (US); Jia-En Pan, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 58 days.

(21) Appl. No.: 17/139,225

(22) Filed: Dec. 31, 2020

(65) Prior Publication Data

US 2022/0207270 A1    Jun. 30, 2022

(51) Int. Cl.
*G06V 20/20* (2022.01)
*G06T 7/33* (2017.01)
(Continued)

(52) U.S. Cl.
CPC .............. *G06V 20/20* (2022.01); *G01S 17/89* (2013.01); *G06K 9/6232* (2013.01); *G06T 7/33* (2017.01);
(Continued)

(58) Field of Classification Search
CPC ........ G06V 20/20; G06V 10/56; G06V 20/13; G01S 17/89; G06K 9/6232; G06T 7/33;
(Continued)

(56) References Cited

U.S. PATENT DOCUMENTS

2020/0082560 A1* 3/2020 Nezhadarya ............ G06T 15/10
2020/0160559 A1* 5/2020 Urtasun ................... G06K 9/629
(Continued)

FOREIGN PATENT DOCUMENTS

CN    109087274 A    12/2018
EP    3690482 A1     8/2020

OTHER PUBLICATIONS

Qi et al., "Pointnet: Deep learning on point sets for 3d classification and segmentation," In Proceedings of the IEEE conference on computer vision and pattern recognition, pp. 652-660, 2017.
(Continued)

*Primary Examiner* — Maurice L. McDowell, Jr.
(74) *Attorney, Agent, or Firm* — Christopher G. Darrow; Darrow Mustafa PC

(57) ABSTRACT

A bird's eye view feature map, augmented with semantic information, can be used to detect an object in an environment. A point cloud data set augmented with the semantic information that is associated with identities of classes of objects can be obtained. Features can be extracted from the point cloud data set. Based on the features, an initial bird's eye view feature map can be produced. Because operations performed on the point cloud data set to extract the features or to produce the initial bird's eye view feature map can have an effect of diminishing an ability to distinguish the semantic information in the initial bird's eye view feature map, the initial bird's eye view feature map can be augmented with the semantic information to produce an augmented bird's eye view feature map. Based on the augmented bird's eye view feature map, the object in the environment can be detected.

20 Claims, 11 Drawing Sheets

(51) Int. Cl.
*G06K 9/62* (2022.01)
*G01S 17/89* (2020.01)
*G06T 11/00* (2006.01)
*G06V 10/56* (2022.01)
*G06V 20/13* (2022.01)

(52) U.S. Cl.
CPC .............. *G06T 11/00* (2013.01); *G06V 10/56* (2022.01); *G06V 20/13* (2022.01); *G06T 2207/10028* (2013.01); *G06T 2207/10032* (2013.01); *G06T 2210/56* (2013.01)

(58) Field of Classification Search
CPC ........... G06T 11/00; G06T 2207/10028; G06T 2207/10032; G06T 2210/56
See application file for complete search history.

(56) References Cited

U.S. PATENT DOCUMENTS

| 2021/0027524 | A1* | 1/2021 | Moss | G06T 7/90 |
| 2022/0043152 | A1* | 2/2022 | Li | G01S 17/66 |
| 2022/0067943 | A1* | 3/2022 | Claessen | G06V 10/26 |

OTHER PUBLICATIONS

Zhou et al., "Voxelnet: End-to-end learning for point cloud based 3d object detection," In Proceedings of the IEEE Conference on Computer Vision and Pattern Recognition, pp. 4490-4499, 2018.

Liu et al., "Ssd: Single shot multibox detector," In European conference on computer vision, pp. 21-37, vol. 9905, Springer, Cham, Dec. 29, 2016.

Lang et al., "Pointpillars: Fast encoders for object detection from point clouds," In Proceedings of the IEEE Conference on Computer Vision and Pattern Recognition, pp. 12697-12705, May 7, 2019.

Shi et al., "Pointrcnn: 3d object proposal generation and detection from point cloud," In: Proceedings of the IEEE Conference on Computer Vision and Pattern Recognition, pp. 770-779, 2019.

Vora et al., "PointPainting: Sequential Fusion for 3D Object Detection," Proceedings of the IEEE/CVF Conference on Computer Vision and Pattern Recognition, pp. 4604-4612, 2020.

Gumhold et al., "Feature Extraction from Point Clouds," In Proceedings of the 10th International Meshing Roundtable, pp. 1-10, 2001.

Yang et al., "PIXOR: Real-time 3D Object Detection from Point Clouds," Proceedings of the IEEE Conference on Computer Vision and Pattern Recognition, pp. 7652-7660, 2018.

Wang et al., "Fusing Bird's Eye View LIDAR Point Cloud and Front View Camera Image for Deep Object Detection," pp. 1-12, arXiv:1711.06703v3 [cs.CV] Feb. 14, 2018.

Ku et al., "Joint 3D Proposal Generation and Object Detection from View Aggregation," 2018 IEEE/RSJ International Conference on Intelligent Robots and Systems (IROS), Madrid, 2018, pp. 1-8.

Kong et al., "Semantic Graph Based Place Recognition for 3D Point Clouds," pp. 1-8, arXiv:2008.11459v1 [cs.CV] Aug. 26, 2020.

Chen et al., "Multi-view 3d object detection network for autonomous driving," In Proceedings of the IEEE Conference on Computer Vision and Pattern Recognition, pp. 1907-1915, 2017.

* cited by examiner

Table 400

| Point #1 | | Point #2 | | Point #3 | | Point #4 | |
|---|---|---|---|---|---|---|---|
| $\rho$ | 8.31 ft. | $\rho$ | 7.29 ft. | $\rho$ | 7.12 ft. | $\rho$ | 6.95 ft. |
| $\phi$ | 76° | $\phi$ | 68° | $\phi$ | 71° | $\phi$ | 76° |
| z | 6.00 in. | z | 6.00 in. | z | 6.00 in. | z | 6.00 in. |

(402 braces the first row)

| Point #5 | | Point #6 | | Point #7 | | Point #8 | |
|---|---|---|---|---|---|---|---|
| $\rho$ | 6.78 ft. | $\rho$ | 6.78 ft. | $\rho$ | 7.27 ft. | $\rho$ | 7.29 ft. |
| $\phi$ | 84° | $\phi$ | 91° | $\phi$ | 104° | $\phi$ | 68° |
| z | 6.00 in. | z | 6.00 in. | z | 6.00 in. | z | 3.00 in. |

| Point #9 | | Point #10 | | Point #11 | | Point #12 | |
|---|---|---|---|---|---|---|---|
| $\rho$ | 6.44 ft. | $\rho$ | 5.43 ft. | $\rho$ | 5.85 ft. | $\rho$ | 5.45 ft. |
| $\phi$ | 71° | $\phi$ | 76° | $\phi$ | 84° | $\phi$ | 86° |
| z | 4.50 in. | z | 6.00 in. | z | 4.50 in. | z | 6.00 in. |

| Point #13 | | Point #14 | | Point #15 | | Point #16 | |
|---|---|---|---|---|---|---|---|
| $\rho$ | 5.45 ft. | $\rho$ | 5.59 ft. | $\rho$ | 5.86 ft. | $\rho$ | 6.00 ft. |
| $\phi$ | 92° | $\phi$ | 104° | $\phi$ | 111° | $\phi$ | 115° |
| z | 6.00 in. | z | 6.00 in. | z | 6.00 in. | z | 6.00 in. |

| Point #17 | | Point #18 | | Point #19 | | Point #20 | |
|---|---|---|---|---|---|---|---|
| $\rho$ | 7.29 ft. | $\rho$ | 6.44 ft. | $\rho$ | 5.43 ft. | $\rho$ | 5.85 ft. |
| $\phi$ | 68° | $\phi$ | 71° | $\phi$ | 76° | $\phi$ | 84° |
| z | 0 in. | z | 1.5 in. | z | 3.00 in. | z | 1.50 in. |

| Point #21 | | Point #22 | | Point #23 | | Point #24 | |
|---|---|---|---|---|---|---|---|
| $\rho$ | 5.45 ft. | $\rho$ | 4.36 ft. | $\rho$ | 4.09 ft. | $\rho$ | 4.36 ft. |
| $\phi$ | 86° | $\phi$ | 92° | $\phi$ | 104° | $\phi$ | 111° |
| z | 3.00 in. | z | 4.50 in. | z | 6.00 in. | z | 4.50 in. |

| Point #25 | | Point #26 | | Point #27 | | Point #28 | |
|---|---|---|---|---|---|---|---|
| $\rho$ | 6.00 ft. | $\rho$ | 5.43 ft. | $\rho$ | 5.45 ft. | $\rho$ | 4.36 ft. |
| $\phi$ | 115° | $\phi$ | 76° | $\phi$ | 86° | $\phi$ | 92° |
| z | 3.00 in. | z | 0 in. | z | 0 in. | z | 1.50 in. |

| Point #29 | | Point #30 | | Point #31 | | Point #32 | |
|---|---|---|---|---|---|---|---|
| $\rho$ | 4.09 ft. | $\rho$ | 4.36 ft. | $\rho$ | 6.00 ft. | $\rho$ | 4.09 ft. |
| $\phi$ | 104° | $\phi$ | 111° | $\phi$ | 115° | $\phi$ | 104° |
| z | 3.00 in. | z | 1.50 in. | z | 0 in. | z | 0 in. |

FIG. 4

Table 500

| Point #1 | |
|---|---|
| $\rho$ | 8.31 ft. |
| $\phi$ | 76° |
| z | 6.00 in. |
| class | box |
| code | red |

| Point #2 | |
|---|---|
| $\rho$ | 7.29 ft. |
| $\phi$ | 68° |
| z | 6.00 in. |
| class | box |
| code | red |

| Point #3 | |
|---|---|
| $\rho$ | 7.12 ft. |
| $\phi$ | 71° |
| z | 6.00 in. |
| class | box |
| code | red |

| Point #4 | |
|---|---|
| $\rho$ | 6.95 ft. |
| $\phi$ | 76° |
| z | 6.00 in. |
| class | box |
| code | red |

| Point #5 | |
|---|---|
| $\rho$ | 6.78 ft. |
| $\phi$ | 84° |
| z | 6.00 in. |
| class | box |
| code | red |

| Point #6 | |
|---|---|
| $\rho$ | 6.78 ft. |
| $\phi$ | 91° |
| z | 6.00 in. |
| class | box |
| code | red |

| Point #7 | |
|---|---|
| $\rho$ | 7.27 ft. |
| $\phi$ | 104° |
| z | 6.00 in. |
| class | barrel |
| code | blue |

| Point #8 | |
|---|---|
| $\rho$ | 7.29 ft. |
| $\phi$ | 68° |
| z | 3.00 in. |
| class | box |
| code | red |

| Point #9 | |
|---|---|
| $\rho$ | 6.44 ft. |
| $\phi$ | 71° |
| z | 4.50 in. |
| class | box |
| code | red |

| Point #10 | |
|---|---|
| $\rho$ | 5.43 ft. |
| $\phi$ | 76° |
| z | 6.00 in. |
| class | box |
| code | red |

| Point #11 | |
|---|---|
| $\rho$ | 5.85 ft. |
| $\phi$ | 84° |
| z | 4.50 in. |
| class | box |
| code | red |

| Point #12 | |
|---|---|
| $\rho$ | 5.45 ft. |
| $\phi$ | 86° |
| z | 6.00 in. |
| class | barrel |
| code | blue |

| Point #13 | |
|---|---|
| $\rho$ | 5.45 ft. |
| $\phi$ | 92° |
| z | 6.00 in. |
| class | barrel |
| code | blue |

| Point #14 | |
|---|---|
| $\rho$ | 5.59 ft. |
| $\phi$ | 104° |
| z | 6.00 in. |
| class | barrel |
| code | blue |

| Point #15 | |
|---|---|
| $\rho$ | 5.86 ft. |
| $\phi$ | 111° |
| z | 6.00 in. |
| class | barrel |
| code | blue |

| Point #16 | |
|---|---|
| $\rho$ | 6.00 ft. |
| $\phi$ | 115° |
| z | 6.00 in. |
| class | barrel |
| code | blue |

| Point #17 | |
|---|---|
| $\rho$ | 7.29 ft. |
| $\phi$ | 68° |
| z | 0 in. |
| class | box |
| code | red |

| Point #18 | |
|---|---|
| $\rho$ | 6.44 ft. |
| $\phi$ | 71° |
| z | 1.5 in. |
| class | box |
| code | red |

| Point #19 | |
|---|---|
| $\rho$ | 5.43 ft. |
| $\phi$ | 76° |
| z | 3.00 in. |
| class | box |
| code | red |

| Point #20 | |
|---|---|
| $\rho$ | 5.85 ft. |
| $\phi$ | 84° |
| z | 1.50 in. |
| class | box |
| code | red |

FIG. 5A

Table 500

| Point #21 | |
|---|---|
| ρ | 5.45 ft. |
| φ | 86° |
| z | 3.00 in. |
| class | barrel |
| code | blue |

| Point #22 | |
|---|---|
| ρ | 4.36 ft. |
| φ | 92° |
| z | 4.50 in. |
| class | barrel |
| code | blue |

| Point #23 | |
|---|---|
| ρ | 4.09 ft. |
| φ | 104° |
| z | 6.00 in. |
| class | barrel |
| code | blue |

| Point #24 | |
|---|---|
| ρ | 4.36 ft. |
| φ | 111° |
| z | 4.50 in. |
| class | barrel |
| code | blue |

| Point #25 | |
|---|---|
| ρ | 6.00 ft. |
| φ | 115° |
| z | 3.00 in. |
| class | barrel |
| code | blue |

| Point #26 | |
|---|---|
| ρ | 5.43 ft. |
| φ | 76° |
| z | 0 in. |
| class | box |
| code | red |

| Point #27 | |
|---|---|
| ρ | 5.45 ft. |
| φ | 86° |
| z | 0 in. |
| class | barrel |
| code | blue |

| Point #28 | |
|---|---|
| ρ | 4.36 ft. |
| φ | 92° |
| z | 1.50 in. |
| class | barrel |
| code | blue |

| Point #29 | |
|---|---|
| ρ | 4.09 ft. |
| φ | 104° |
| z | 3.00 in. |
| class | barrel |
| code | blue |

| Point #30 | |
|---|---|
| ρ | 4.36 ft. |
| φ | 111° |
| z | 1.50 in. |
| class | barrel |
| code | blue |

| Point #31 | |
|---|---|
| ρ | 6.00 ft. |
| φ | 115° |
| z | 0 in. |
| class | barrel |
| code | blue |

| Point #32 | |
|---|---|
| ρ | 4.09 ft. |
| φ | 104° |
| z | 0 in. |
| class | barrel |
| code | blue |

FIG. 5B

USING A BIRD'S EYE VIEW FEATURE MAP, AUGMENTED WITH SEMANTIC INFORMATION, TO DETECT AN OBJECT IN AN ENVIRONMENT

TECHNICAL FIELD

The disclosed technologies are directed to using a bird's eye view feature map, augmented with semantic information, to detect an object in an environment.

BACKGROUND

Computer vision is a phrase that can be used to describe an interdisciplinary scientific field directed to developing processes that enable a computer to derive information from a visual representation of an environment in order to support one or more operations to be performed by the computer. Specifically, for a computer that is a component of an autonomous mobile agent, abilities: (1) to detect one or more objects in an environment and (2) to distinguish one object from another object can be features that are important for one or more operations to be performed by the autonomous mobile agent. The visual representation of the environment can have different forms. A two-dimensional image produced, for example, by a camera can be characterized as having a large amount of data about a visual appearance of the environment, but having little information about one or more distances between the camera and the one or more objects in the environment. In contrast, a point cloud data set produced, for example, by a lidar device can be characterized as having a small amount of data about the visual appearance of the environment, but having precise information about the one or more distances between the lidar device and the one or more objects in the environment.

SUMMARY

In an embodiment, a system for detecting an object in an environment can include one or more processors and a memory. The memory can be communicably coupled to the one or more processors. The memory can store a feature extraction module, a feature map production module, and an object detection module. The feature extraction module can include instructions that when executed by the one or more processors cause the one or more processors to obtain a point cloud data set augmented with semantic information associated with identities of classes of objects. The feature extraction module can include instructions that when executed by the one or more processors cause the one or more processors to extract features from the point cloud data set. The feature map production module can include instructions that when executed by the one or more processors cause the one or more processors to produce, based on the features, an initial bird's eye view feature map. The feature map production module can include instructions that when executed by the one or more processors cause the one or more processors to augment the initial bird's eye view feature map with the semantic information to produce an augmented bird's eye view feature map. The object detection module can include instructions that when executed by the one or more processors cause the one or more processors to detect, based on the augmented bird's eye view feature map, the object in the environment.

In another embodiment, a method for detecting an object in an environment can include obtaining, by a processor, a point cloud data set augmented with semantic information associated with identities of classes of objects. The method can include extracting, by the processor, features from the point cloud data set. The method can include producing, by the processor and based on the features, an initial bird's eye view feature map. The method can include augmenting, by the processor, the initial bird's eye view feature map with the semantic information to produce an augmented bird's eye view feature map. The method can include detecting, by the processor and based on the augmented bird's eye view feature map, the object in the environment.

In another embodiment, a non-transitory computer-readable medium for detecting an object in an environment can include instructions that when executed by one or more processors cause the one or more processors to obtain a point cloud data set augmented with semantic information associated with identities of classes of objects. The non-transitory computer-readable medium can include instructions that when executed by the one or more processors cause the one or more processors to extract features from the point cloud data set. The non-transitory computer-readable medium can include instructions that when executed by the one or more processors cause the one or more processors to produce, based on the features, an initial bird's eye view feature map. The non-transitory computer-readable medium can include instructions that when executed by the one or more processors cause the one or more processors to augment the initial bird's eye view feature map with the semantic information to produce an augmented bird's eye view feature map. The non-transitory computer-readable medium can include instructions that when executed by the one or more processors cause the one or more processors to detect, based on the augmented bird's eye view feature map, the object in the environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 is a set of tables of an example of an initial point cloud data set that corresponds to the point cloud, according to the disclosed technologies.

FIGS. 5A and 5B are a set of tables of an example of a point cloud data set augmented with semantic information, according to the disclosed technologies.

DETAILED DESCRIPTION

The disclosed technologies can use a bird's eye view feature map, augmented with semantic information, to detect an object in an environment. A point cloud data set augmented with semantic information associated with identities of classes of objects can be obtained. For example: (1) a two-dimensional image of the object in the environment can be obtained, (2) the two-dimensional image can be segmented to produce the semantic information, (3) an initial point cloud data set that corresponds to the two-dimensional image can be obtained (e.g., the initial point cloud data set can be obtained by a lidar device and a corresponding relationship between data of the initial point cloud data set and pixels of the two-dimensional image can be obtained by a three-dimensional to two-dimensional projection), and (4) the semantic information can be mapped to points of the initial point cloud data set to produce the point cloud data set augmented with the semantic information. Features can be extracted from the point cloud data set augmented with the semantic information. Based on the features, an initial bird's eye view feature map can be produced. Using a bird's eye view can facilitate abilities: (1) to distinguish, in the environment, one object from another object and (2) to determine one or more distances between a device that produced the initial point cloud data set and the one or more objects in the environment. Because operations performed on data in the point cloud data set to extract the features, to produce the initial bird's eye view feature map, or both can have an effect of diminishing an ability to distinguish the semantic information in data for the initial bird's eye view feature map, the initial bird's eye view feature map can be augmented with the semantic information to produce an augmented bird's eye view feature map. Based on the augmented bird's eye view feature map, the object in the environment can be detected. Advantageously, because points produced by lidar devices, for example, can be relatively small in comparison with a size of a human being, the disclosed technologies can improve an ability to detect an object that has a small size or for which an initial point cloud data set has only a few points of data.

Figure 1:
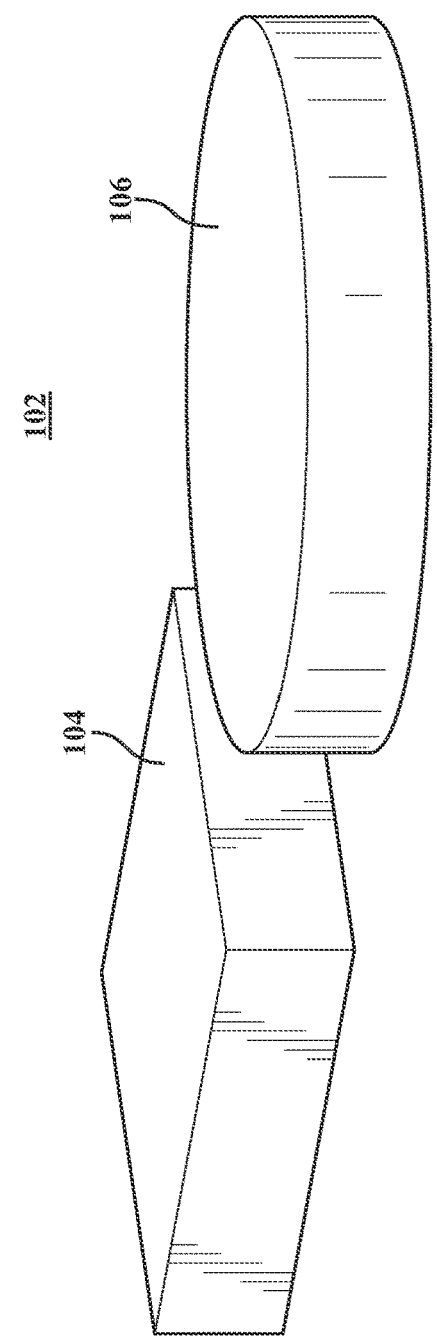
FIG. 1 is a diagram that illustrates an example of a two-dimensional image of an environment, according to the disclosed technologies.

FIG. 1 is a diagram that illustrates an example of a two-dimensional image 100 of an environment 102, according to the disclosed technologies. For illustrative purposes, the environment 102 can be a portion of a floor of a warehouse. The two-dimensional image 100 can include, for example, two objects: a first object 104 (e.g., a box) and a second object 106 (e.g., a barrel). For example, from a viewpoint of a device (e.g., a camera) that produced the two-dimensional image 100, a portion of the first object 104 (e.g., the box) is occluded by the second object 106 (e.g., the barrel) so that an ability to distinguish the first object 104 (e.g., the box) from the second object 106 (e.g., the barrel) may be difficult.

Figure 2:
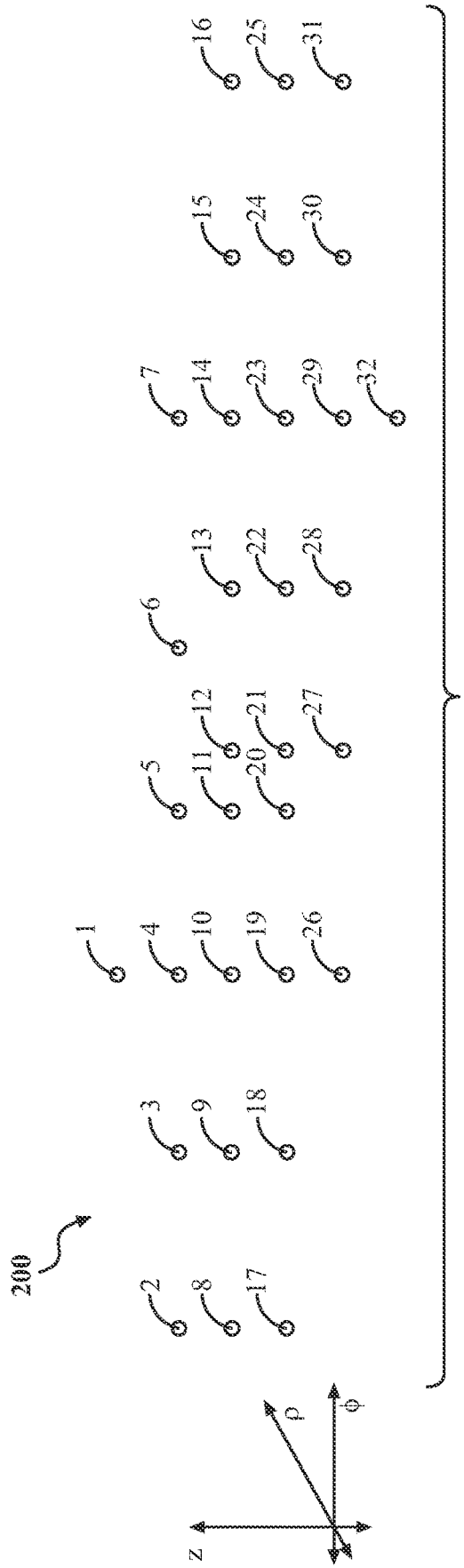
FIG. 2 is a diagram that illustrates an example of a point cloud that corresponds to the two-dimensional image, according to the disclosed technologies.

FIG. 2 is a diagram that illustrates an example of a point cloud 200 that corresponds to the two-dimensional image 100, according to the disclosed technologies. The point cloud 200 can include, for example, Point #1 through Point #32.

Figure 3:
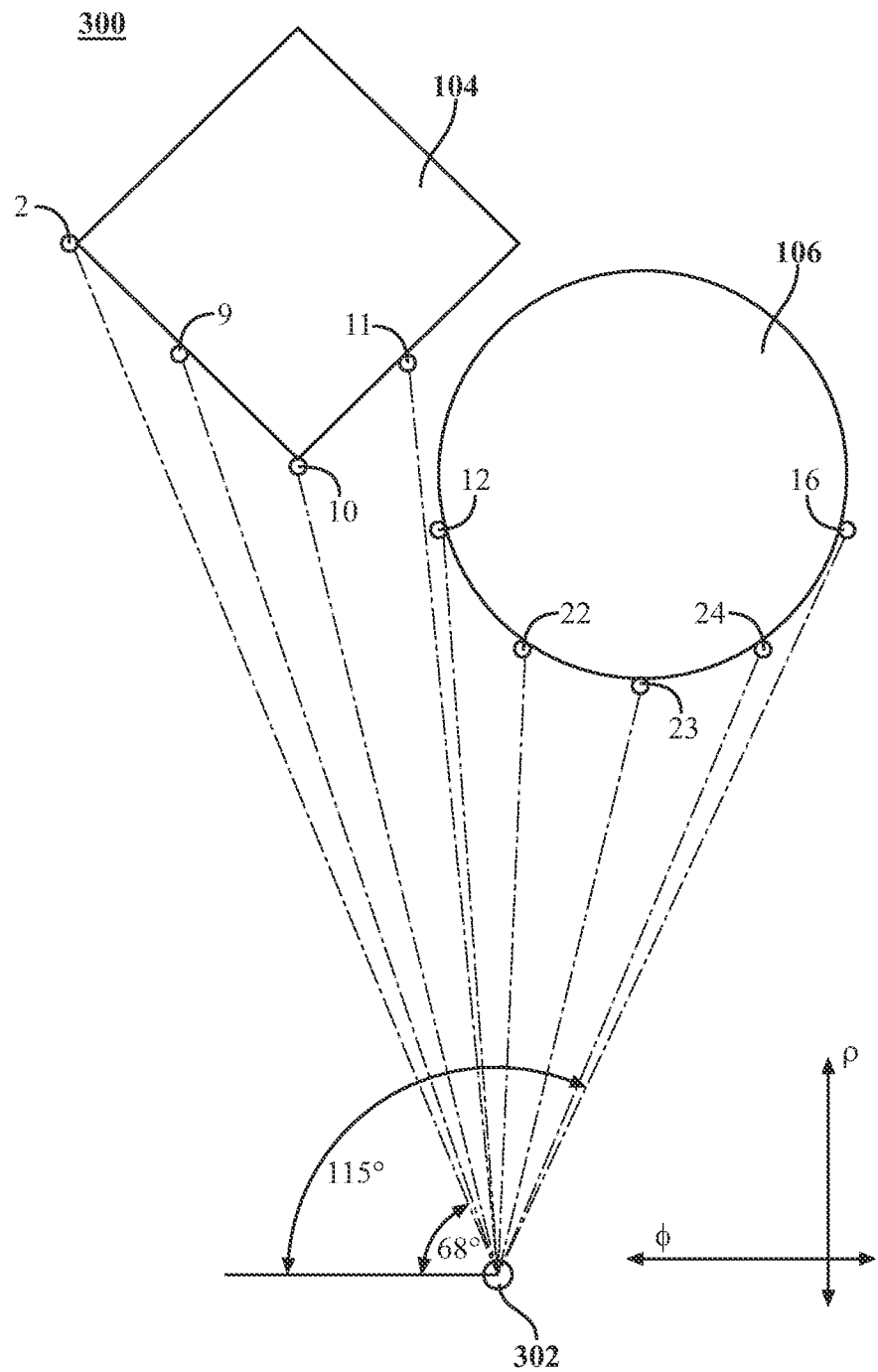
FIG. 3 is a diagram that illustrates an example of a process that produced the point cloud, according to the disclosed technologies.

FIG. 3 is a diagram that illustrates an example of a process 300 that produced the point cloud 200, according to the disclosed technologies. For example, in the process 300, a device 302 (e.g., a lidar device) that produced the point cloud 200 can include a laser. The device 302 can cause the laser to emit pulses of a coherent light. Beams of the coherent light can be reflected from points on the first object 104 (e.g., the box) and the second object 106 (e.g., the barrel). The device 302 can measure times of flight between emissions of the pulses and receptions of the beams reflected from the points. Distances between the device 302 and the points can be determined from the times of flight. The device 302 can cause the beams of coherent light to sweep through an arc defined, for example, with respect to a horizontal plane. A position of a point can be defined by a coordinate system that includes, for example, a distance between the device 302 and the point ($\rho$, a degree of angular rotation along the arc ($\varphi$), and a height above the horizontal plane (z). For example, the point cloud 200 can include points arrayed along the arc in an inclusive range from 68° to 115°.

FIG. 4 is a set of tables of an example of an initial point cloud data set 400 that corresponds to the point cloud 200, according to the disclosed technologies. For example, FIG. 4 can include a table for each of Point #1 through Point #32. Each table can include data 402 that define a position of a corresponding point in the point cloud 200. With reference to FIGS. 2 and 3, for example, the position of the corresponding point can be defined by the distance between the device 302 (illustrated in FIG. 3) and the point ($\rho$), the degree of angular rotation along the arc ($\varphi$), and the height above the horizontal plane (z). Alternatively, the position of the corresponding point can be defined by any other coordinate system including, for example, a Cartesian coordinate system.

Returning to FIG. 1, for example, one or more of a segmentation process, a classifier, or the like can be used to produce semantic information from the two-dimensional image 100. The semantic information can be associated with identities of classes of objects. For example, because the two-dimensional image 100 was produced in the environment 102 of a warehouse, the one or more of the segmentation process, the classifier, or the like can be configured to identify the classes of objects likely to be located within a warehouse such as, for example: (1) a first class for a box and (2) a second class for a barrel. With reference to FIG. 2, for example, the semantic information can be mapped to points of the point cloud 200 to produce a point cloud data set augmented with semantic information.

FIGS. 5A and 5B are a set of tables of an example of a point cloud data set augmented with semantic information 500, according to the disclosed technologies. For example, FIGS. 5A and 5B can include a table for each of Point #1 through Point #32. Each table can include the data 402 that define the position of the corresponding point in the point cloud 200. Each table can also include data 502 for corresponding class information mapped to the corresponding point. Additionally, for example, the semantic information can include: (1) a first color (e.g., red) for the first class for the box and (2) a second color (e.g., blue) for the second class for the barrel. For example, each table can include data 504 for corresponding code information (e.g., color) associated with the corresponding class. With reference to FIGS. 2, 5A, and 5B, for example, causing Point #1 through Point #32 to be presented in a manner so that each point includes its corresponding color can improve an ability to distinguish the first object 104 (e.g., the box) from the second object 106 (e.g., the barrel) in the point cloud 200. For example, with the class information and the code information (e.g., color) mapped to the points of the point cloud 200: (1) the points associated with the first class for the box (e.g., red) can include: Point #1 through Point #6, Point #8 through Point #11, Point #17 through Point #20, and Point #26 and (2) the points associated with the second class for the barrel (e.g., blue) can include: Point #7, Point #12 through Point #16, Point #21 through Point #25, Point #27 through Point #31, and Point #32.

Figure 6:
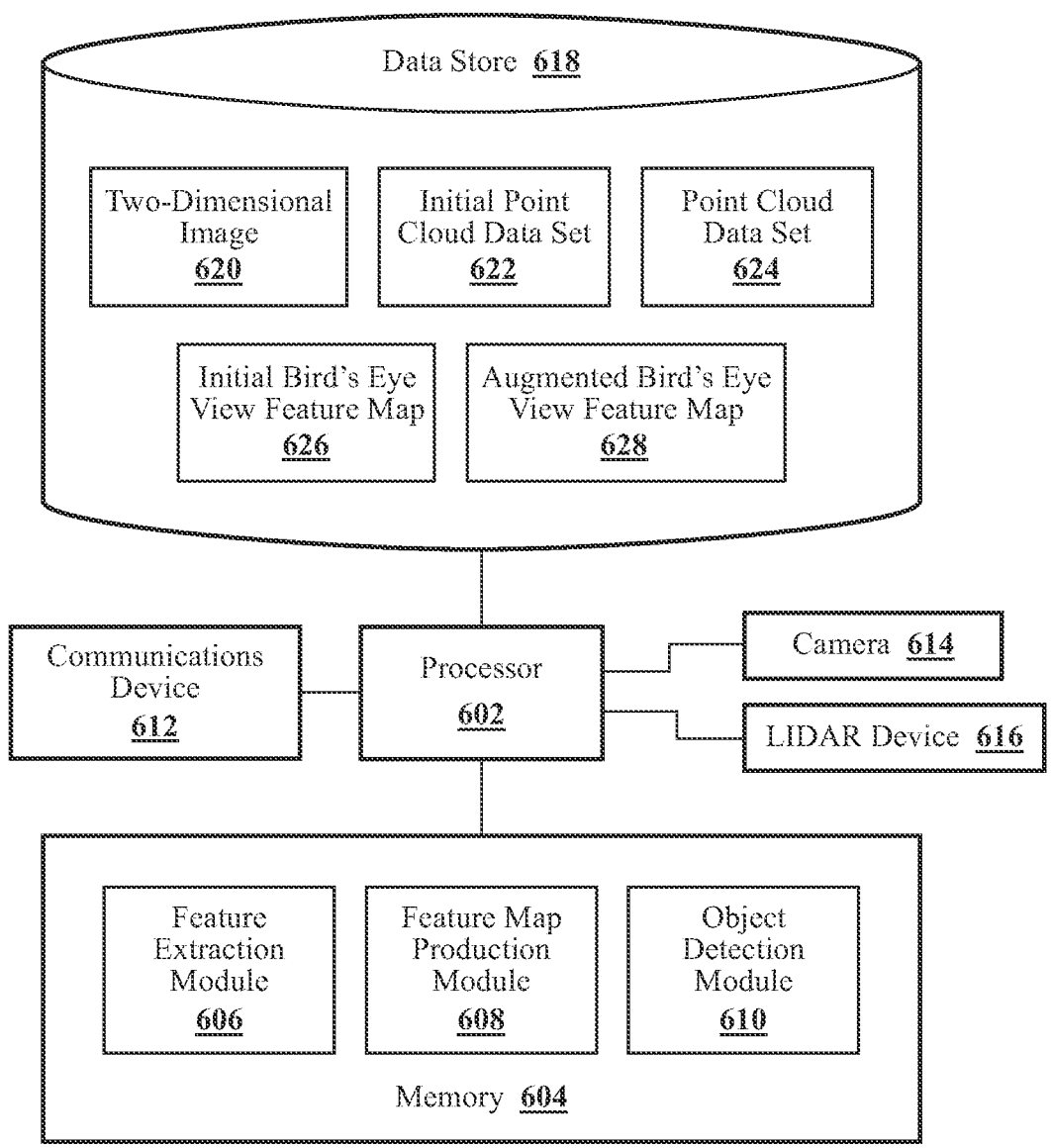
FIG. 6 is a block diagram that illustrates an example of a system for detecting an object in an environment, according to the disclosed technologies.

FIG. 6 is a block diagram that illustrates an example of a system 600 for detecting an object in an environment, according to the disclosed technologies. The system 600 can include, for example, a processor 602 and a memory 604. The memory 604 can be communicably coupled to the processor 602. For example, the memory 604 can store a feature extraction module 606, a feature map production module 608, and an object detection module 610. For example, the system 600 can be disposed in an autonomous mobile agent. For example, the autonomous mobile agent can include an autonomous vehicle, a mobile robot, or the like.

The feature extraction module 606 can include instructions that function to control the processor 602 to obtain a point cloud data set augmented with semantic information associated with identities of classes of objects. For example, the point cloud data set augmented with the semantic information can be the point cloud data set augmented with the semantic information 500 illustrated in FIGS. 5A and 5B. Additionally or alternatively, for example, the semantic information can include probability distributions of predictions of the identities of the classes of objects. That is, because: (1) the disclosed technologies are directed to detect an object in an environment and (2) the semantic information is produced early in a process of the disclosed technologies, the semantic information may be inaccurate and, therefore, the semantic information may be better characterized as probability distributions of predictions of the identities of the classes of objects. Additionally, for example, the semantic information can include: (1) a first color for a first class of the classes of objects and (2) a second color for a second class of the classes of objects. For example, the semantic information can include: (1) a first color (e.g., red) for the first class for the box and (2) a second color (e.g., blue) for the second class for the barrel as illustrated in FIGS. 5A and 5B.

In a first implementation, the system 600 can further include a communications device 612. The communications device 612 can be communicably coupled to the processor 602. The instructions to obtain the point cloud data set can include instructions that function to control the processor 602 to receive, via the communications device 612, the point cloud data set.

In a second implementation, the instructions to obtain the point cloud data set can include instructions that function to control the processor 602 to obtain a two-dimensional image of the object in the environment. For example, the two-dimensional image can be the two-dimensional image 100 illustrated in FIG. 1. For example, the system 600 can further include a camera 614. The camera 614 can be configured to produce the two-dimensional image.

In the second implementation, the instructions to obtain the point cloud data set can include instructions that function to control the processor 602 to segment the two-dimensional image to produce the semantic information.

In the second implementation, the instructions to obtain the point cloud data set can include instructions that function to control the processor 602 to obtain an initial point cloud data set that corresponds to the two-dimensional image. For example, the initial point cloud data set can be the initial point cloud data set 400, illustrated in FIG. 4, of the point cloud 200 illustrated in FIG. 2. For example, the system 600 can further include a lidar device 616. The lidar device 616 can be configured to produce the initial point cloud data set.

In a variation of the second implementation, the instructions to obtain the point cloud data set can include instructions that function to control the processor 602 to correct a misalignment between the two-dimensional image and the initial point cloud data set. For example, the misalignment can be due to parallax between a device that produced the two-dimensional image (e.g., the camera 614) and a device that produced the initial point cloud data set (e.g., the lidar device 616), a miscalibration between the device that produced the two-dimensional image (e.g., the camera 614) and the device that produced the initial point cloud data set (e.g., the lidar device 616), or the like.

In the second implementation, the instructions to obtain the point cloud data set can include instructions that function to control the processor 602 to map the semantic information to points of the initial point cloud data set to produce the point cloud data set augmented with the semantic information. For example, the point cloud data set augmented with the semantic information can be the point cloud data set augmented with the semantic information 500 illustrated in FIGS. 5A and 5B.

In the second implementation, for example, the system 600 can further include a data store 618. The data store 618 can be communicably coupled to the processor 602. The data store 618 can be configured to store one or more of the two-dimensional image 620 or the initial point cloud data set 622.

The feature extraction module 606 can include instructions that function to control the processor 602 to extract features from the point cloud data set. With reference to FIGS. 5A and 5B, for example, the instructions to extract the features from the point cloud data set can include instructions initially to segregate the points associated with the first class for the box (e.g., Point #1 through Point #6, Point #8 through Point #11, Point #17 through Point #20, and Point #26) from the points associated with the second class for the barrel (e.g., Point #7, Point #12 through Point #16, Point #21 through Point #25, Point #27 through Point #31, and Point #32). For example, the instructions to extract the features from the point cloud data set can include instructions thereafter to perform one or more analyses of the data for the points associated with the first class for the box separate from one or more analyses of the data for the points associated with the second class for the barrel.

For example, regarding the first class for the box, the one or more analyses can determine that: (1) Point #1 through Point #6 and Point #10 form a first plane (at a height above the horizontal plane (z) of 6.00 in.), (2) Point #17 and Point #26 form a second plane (at a height above the horizontal plane (z) of 0 in.), (3) Point #2, Point #8 through Point #10, Point #17 through Point #19, and Point #26 form a third plane, (4) Point #6, Point #10, Point #11, Point #19, Point

20, and Point #26 form a fourth plane, (5) because Point #2 and Point #10 are disposed in both the first plane and the third plane, Point #2 and Point #10 are likely disposed on a first linear edge, and (6) because Point #6 and Point #10 are disposed in both the first plane and the fourth plane, Point #6 and Point #10 are likely disposed on a second linear edge.

For example, regarding the second class for the barrel, the one or more analyses can determine that: (1) Point #7, Point #12 through Point #16, and Point #23 form a first plane (at a height above the horizontal plane (z) of 6.00 in.), (2) Point #27, Point #31, and Point #32 form a second plane (at a height above the horizontal plane (z) of 0 in.), (3) a circle having a center at Point #14 and a radius of 1.50 ft. intersects Point #7, Point #12, Point #16, and Point #23, (4) a line formed by Point #22 and Point #28 intersects the circle, (5) a line formed by Point #24 and Point #30 intersects the circle, and (6) because Point #12, Point #16, and Point #23 are disposed in both the first plane and the circle, Point #12, Point #16, and Point #23 are likely disposed on an arc-shaped edge with a center at Point #14 and a radius of 1.50 ft.

Returning to FIG. 6, in a third implementation, the instructions to extract the features from the point cloud data set can include instructions that function to control the processor 602 to determine a width of the point cloud data set, a depth of the point cloud data set, and a height of the point cloud data set. With reference to FIGS. 5A and 5B, for example, the processor 602 can determine that the width (w) of the point cloud data set 500 is 5 ft. 6 in., the depth (d) of the point cloud data set 500 is 4 ft. 6 in., and the height (z) of the point cloud data set 500 is 6 in.

Returning to FIG. 6, in the third implementation, the instructions to extract the features from the point cloud data set can include instructions that function to control the processor 602 to discretize the point cloud data set into cells delineated by a grid defined with respect to the width and the depth. Such a grid can be useful to correct a misalignment between the two-dimensional image and the initial point cloud data set. For example, the misalignment can be due to parallax between a device that produced the two-dimensional image (e.g., the camera 614) and a device that produced the initial point cloud data set (e.g., the lidar device 616), a miscalibration between the device that produced the two-dimensional image (e.g., the camera 614) and the device that produced the initial point cloud data set (e.g., the lidar device 616), or the like.

In the third implementation, the instructions to extract the features from the point cloud data set can include instructions that function to control the processor 602 to operate a two-dimensional convolutional neural network to process the cells.

In the third implementation, for example, the semantic information can: (1) include probability distributions of predictions of the identities of the classes of objects and (2) be averaged over at least some of the cells.

Figure 7:
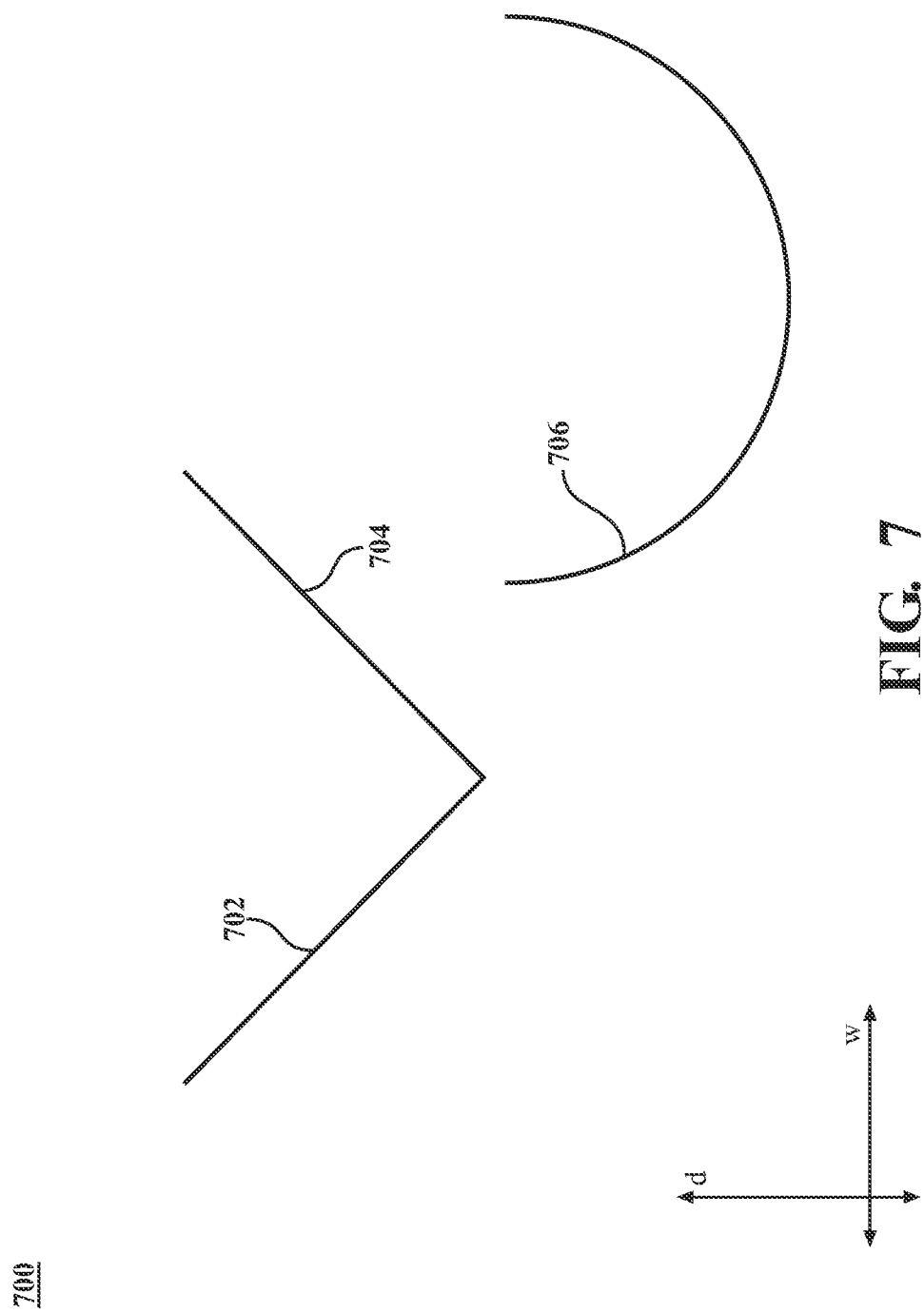
FIG. 7 is a diagram that illustrates an example of an initial bird's eye view feature map, according to the disclosed technologies.

The feature map production module 608 can include instructions that function to control the processor 602 to produce, based on the features, an initial bird's eye view feature map. FIG. 7 is a diagram that illustrates an example of an initial bird's eye view feature map 700, according to the disclosed technologies. For example, the initial bird's eye view feature map 700 can include a first linear edge 702, a second linear edge 704, and an arc-shaped edge 706.

Returning to FIG. 6, for example, one or more of the instructions to extract the features from the point cloud data set or the instructions to produce the initial bird's eye view feature map can include instructions that function to control the processor 602 to perform operations on data in the point cloud data set that have an effect of diminishing an ability to distinguish the semantic information in data for the initial bird's eye view feature map. For example, because the instructions to extract the features from the point cloud data set can include instructions initially to segregate the points associated with the first class for the box from the points associated with the second class for the barrel, but thereafter to perform one or more analyses of the data for the points associated with the first class for the box separate from one or more analyses of the data for the points associated with the second class for the barrel, the features extracted from the point cloud data set can lack the semantic information so that the initial bird's eye view feature map, produced from the features, can also lack the semantic information.

The feature map production module 608 can include instructions that function to control the processor 602 to augment the initial bird's eye view feature map with the semantic information to produce an augmented bird's eye view feature map.

Figure 8:
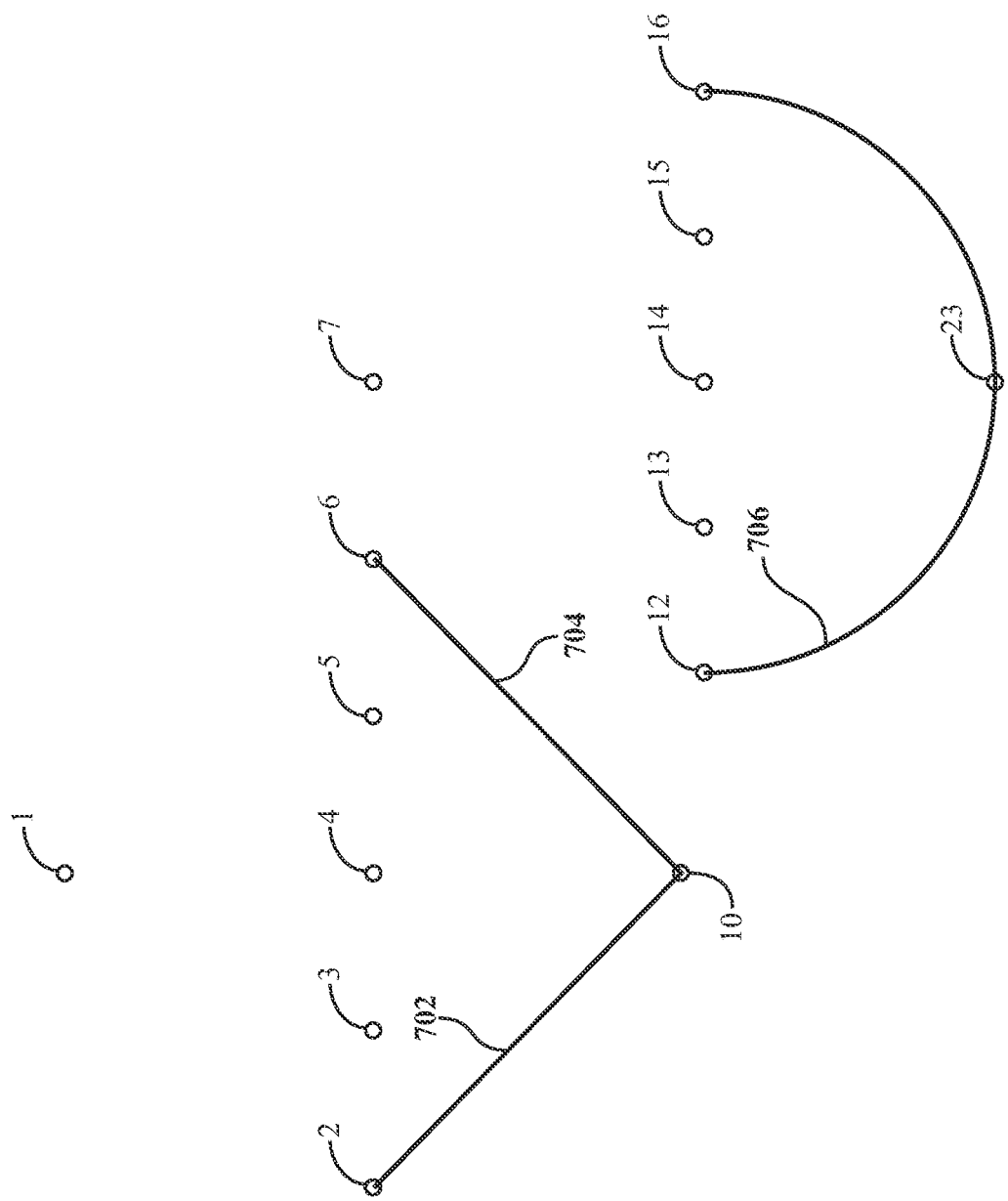
FIG. 8 is a diagram that illustrates an example of a bird's eye view feature map augmented with the semantic information, according to the disclosed technologies.

For example, the system 600 can further include the data store 618. The data store 618 can be communicably coupled to the processor 602. The data store 618 can be configured to store one or more of the point cloud data set 624, the initial bird's eye view feature map 626, or the augmented bird's eye view feature map 628. FIG. 8 is a diagram that illustrates an example of a bird's eye view feature map augmented with the semantic information 800, according to the disclosed technologies. For example, the bird's eye view feature map augmented with the semantic information 800 can include the first linear edge 702, the second linear edge 704, the arc-shaped edge 706, the semantic information (e.g., the first color (e.g., red)) for the first class for the box for Point #1 through Point #6 and Point #10, and the semantic information (e.g., the second color (e.g., blue)) for the first class for the barrel for Point #7, Point #12 through Point #16, and Point #23.

Returning to FIG. 6, the object detection module 610 can include instructions that function to control the processor 602 to detect, based on the augmented bird's eye view feature map 628, the object in the environment. With reference to FIGS. 1, 6, and 8, for example, the object detection module 610 can detect, based on the bird's eye view feature map augmented with the semantic information 800, the first object 104 (e.g., the box) even though from the viewpoint of the device (e.g., the camera 614) that produced the two-dimensional image 100, a portion of the first object 104 (e.g., the box) is occluded by the second object 106 (e.g., the barrel).

For example, in the system 600, one or more of the instructions to obtain the point cloud data set, the instructions to extract the features, the instructions to produce the initial bird's eye view feature map, the instructions to augment the initial bird's eye view feature map, or the instructions to detect the object in the environment can include instructions that function to control the processor 602 to operate a neural network.

Figure 9A:
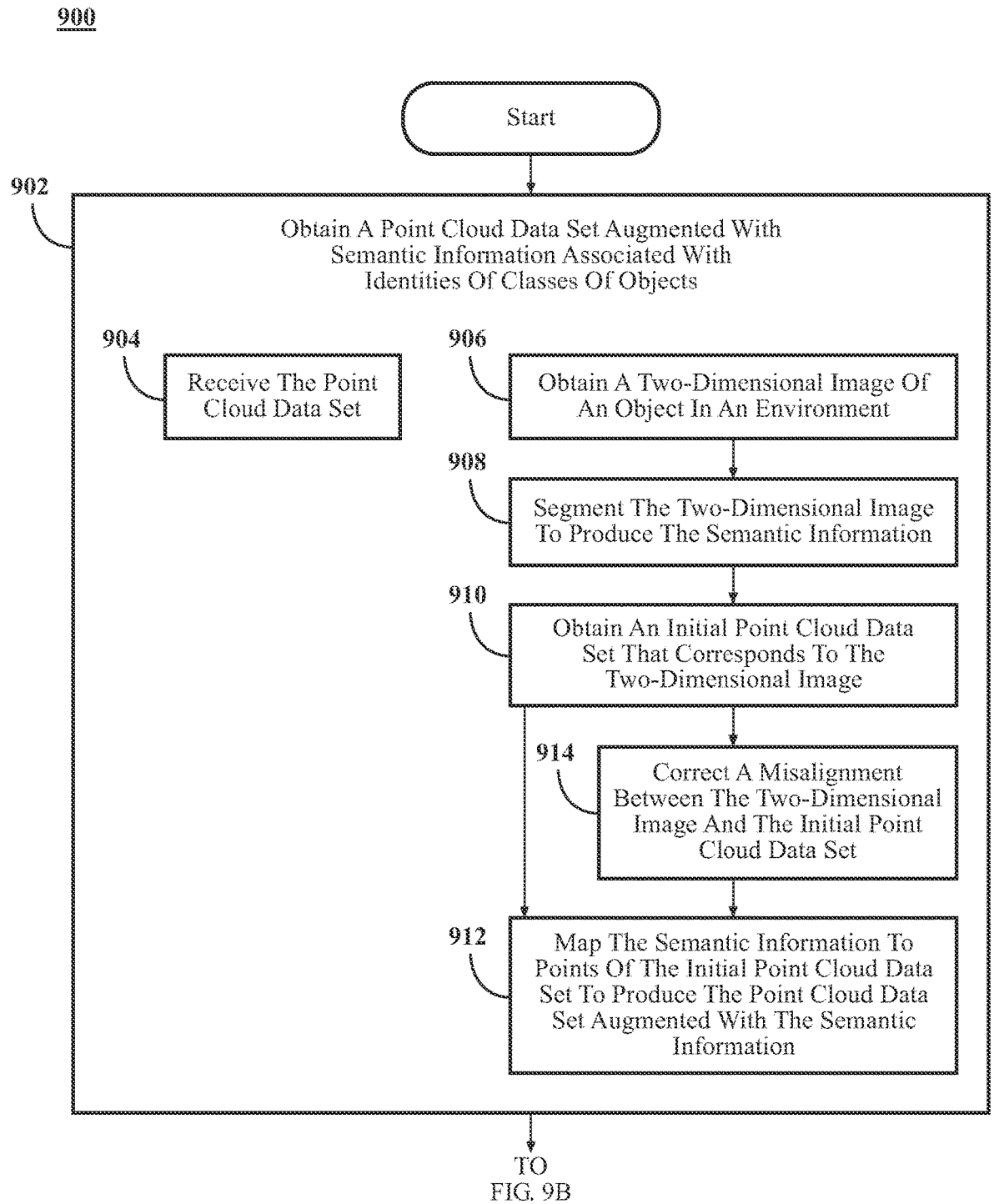
FIGS. 9A and 9B include a flow diagram that illustrates an example of a method that is associated with detecting an object in an environment, according to the disclosed technologies.
Figure 9B:
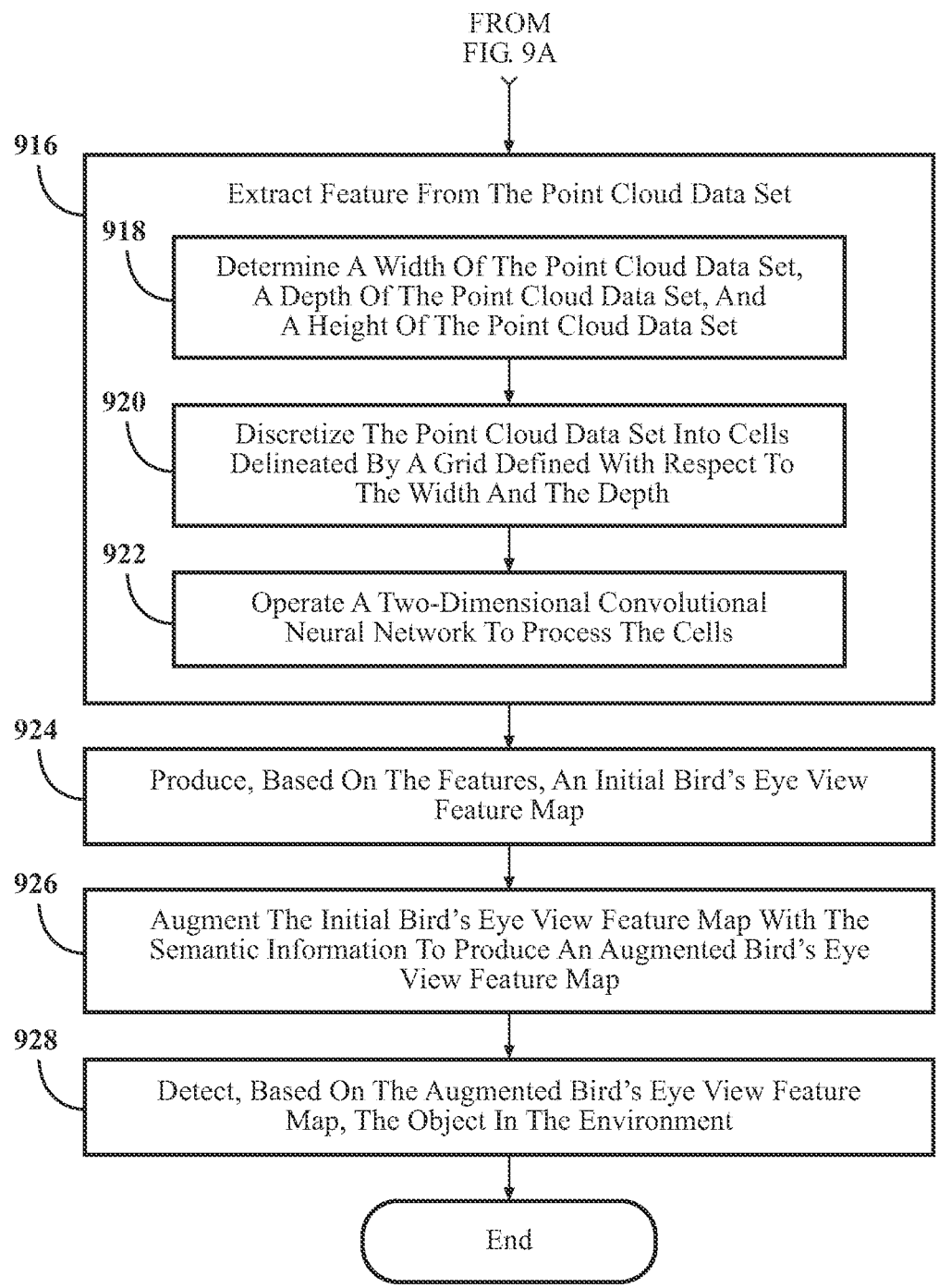

FIGS. 9A and 9B include a flow diagram that illustrates an example of a method 900 that is associated with detecting an object in an environment, according to the disclosed technologies. The method 900 is described from the perspective of the system 600 illustrated in FIG. 6. Although the method 900 is described in combination with the system 600, one of skill in the art understands, in light of the description herein, that the method 900 is not limited to being implemented by the system 600. Rather, the system 600 is an example of a system that may be used to implement the method 900. For example, the method 900 can be performed by an autonomous mobile agent. For example, the autonomous mobile agent can include an autonomous vehicle, a mobile robot, or the like.

In FIG. 9A, in the method 900, at an operation 902, the feature extraction module 606 can obtain a point cloud data set augmented with semantic information associated with identities of classes of objects. Additionally or alternatively, for example, the semantic information can include probability distributions of predictions of the identities of the classes of objects. Additionally, for example, the semantic information can include: (1) a first color for a first class of the classes of objects and (2) a second color for a second class of the classes of objects.

In a first implementation, the operation 902 can include an operation 904. At the operation 904, the feature extraction module 606 can receive, via the communications device 612, the point cloud data set.

In a second implementation, the operation 902 can include an operation 906, an operation 908, an operation 910, and an operation 912. Additionally, for example, the operation 902 can include an operation 914.

At the operation 906, the feature extraction module 606 can obtain the two-dimensional image 620 of the object in the environment. For example, the camera 614 can be configured to produce the two-dimensional image. For example, the data store 618 can be configured to store the two-dimensional image 620.

At the operation 908, the feature extraction module 606 can segment the two-dimensional image 620 to produce the semantic information.

At the operation 910, the feature extraction module 606 can obtain the initial point cloud data set 622 that corresponds to the two-dimensional image 620. For example, the lidar device 616 can be configured to produce the initial point cloud data set 622. For example, the data store 618 can be configured to store the initial point cloud data set 622.

At the operation 914, the feature extraction module 606 can correct a misalignment between the two-dimensional image 620 and the initial point cloud data set 622. For example, the misalignment can be due to parallax between a device that produced the two-dimensional image 620 (e.g., the camera 614) and a device that produced the initial point cloud data set 622 (e.g., the lidar device 616), a miscalibration between the device that produced the two-dimensional image 620 (e.g., the camera 614) and the device that produced the initial point cloud data set 622 (e.g., the lidar device 616), or the like.

At the operation 912, the feature extraction module 606 can map the semantic information to points of the initial point cloud data set 622 to produce the point cloud data set 624 augmented with the semantic information. For example, the data store 618 can be configured to store the point cloud data set 624.

In FIG. 9B, in the method 900, at the operation 916, the feature extraction module 606 can extract features from the point cloud data set 624.

In a third implementation, the operation 916 can include an operation 918, an operation 920, and an operation 922.

At the operation 918, the feature extraction module 606 can determine a width of the point cloud data set 624, a depth of the point cloud data set 624, and a height of the point cloud data set 624.

At the operation 920, the feature extraction module 606 can discretize the point cloud data set 624 into cells delineated by a grid defined with respect to the width and the depth. Such a grid can be useful to correct a misalignment between the two-dimensional image and the initial point cloud data set. For example, the misalignment can be due to parallax between a device that produced the two-dimensional image (e.g., the camera 614) and a device that produced the initial point cloud data set (e.g., the lidar device 616), a miscalibration between the device that produced the two-dimensional image (e.g., the camera 614) and the device that produced the initial point cloud data set (e.g., the lidar device 616), or the like.

At the operation 922, the feature extraction module 606 can operate a two-dimensional convolutional neural network to process the cells.

In the third implementation, for example, the semantic information can: (1) include probability distributions of predictions of the identities of the classes of objects and (2) be averaged over at least some of the cells.

At an operation 924, the feature map production module 608 can produce, based on the features, the initial bird's eye view feature map 626. For example, the data store 618 can be configured to store the initial bird's eye view feature map 626.

For example, one or more of the operation 916 or the operation 924 can perform operations on data in the point cloud data set 624 that have an effect of diminishing an ability to distinguish the semantic information in data for the initial bird's eye view feature map 626.

At an operation 926, the feature map production module 608 can augment the initial bird's eye view feature map 626 with the semantic information to produce the augmented bird's eye view feature map 628. For example, the data store 618 can be configured to store the augmented bird's eye view feature map 628.

At an operation 928, the object detection module 610 can detect, based on the augmented bird's eye view feature map 628, the object in the environment.

For example, one or more of the operation 902, the operation 916, the operation 924, the operation 926, or the operation 928 can operate a neural network.

Figure 10:
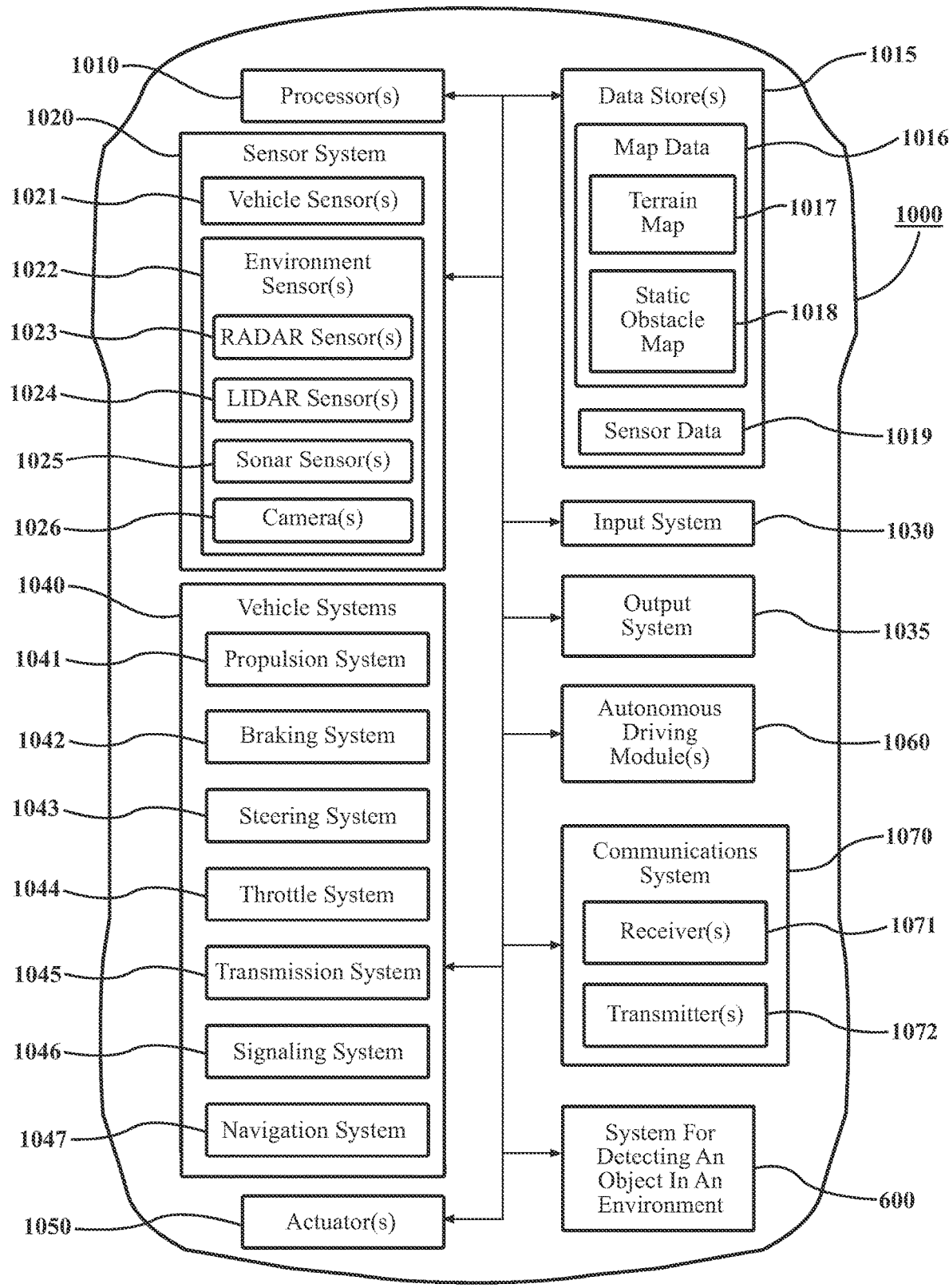
FIG. 10 includes a block diagram that illustrates an example of elements disposed on a vehicle, according to the disclosed technologies.

FIG. 10 includes a block diagram that illustrates an example of elements disposed on a vehicle 1000, according to the disclosed technologies. As used herein, a "vehicle" can be any form of powered transport. In one or more implementations, the vehicle 1000 can be an automobile. While arrangements described herein are with respect to automobiles, one of skill in the art understands, in light of the description herein, that embodiments are not limited to automobiles.

In some embodiments, the vehicle 1000 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 1000 is performed according to inputs received from a user (e.g., human driver). In one or more arrangements, the vehicle 1000 can be a conventional vehicle that is configured to operate in only a manual mode.

In one or more embodiments, the vehicle 1000 can be an automated vehicle. As used herein, "automated vehicle" can refer to a vehicle that operates in an automated mode. As used herein, "automated mode" can refer to navigating and/or maneuvering the vehicle 1000 along a travel route using one or more computing systems to control the vehicle 1000 with minimal or no input from a human driver. In one or more embodiments, the vehicle 1000 can be highly automated or completely automated. In one embodiment, the vehicle 1000 can be configured with one or more semi-automated operational modes in which one or more computing systems perform a portion of the navigation and/or maneuvering of the vehicle along a travel route, and a vehicle operator (i.e., driver) provides inputs to the vehicle 1000 to perform a portion of the navigation and/or maneuvering of the vehicle 1000 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 1000 can include various elements. The vehicle 1000 can have any combination of the various elements illustrated in FIG. 10. In various embodiments, it may not be necessary for the vehicle 1000 to include all of the elements illustrated in FIG. 10. Furthermore, the vehicle 1000 can have elements in addition to those illustrated in FIG. 10. While the various elements are illustrated in FIG. 10 as being located within the vehicle 1000, one or more of these elements can be located external to the vehicle 1000. Furthermore, the elements illustrated may be physically separated by large distances. For example, as described, one or more components of the disclosed system can be implemented within the vehicle 1000 while other components of the system can be implemented within a cloud-computing environment, as described below. For example, the elements can include one or more processors 1010, one or more data stores 1015, a sensor system 1020, an input system 1030, an output system 1035, vehicle systems 1040, one or more actuators 1050, one or more automated driving modules 1060, a communications system 1070, and the system 600 for detecting an object in an environment.

In one or more arrangements, the one or more processors 1010 can be a main processor of the vehicle 1000. For example, the one or more processors 1010 can be an electronic control unit (ECU). For example, functions and/or operations of the processors of the processor 602 (illustrated in FIG. 6) can be realized by the one or more processors 1010.

The one or more data stores 1015 can store, for example, one or more types of data. For example, functions and/or operations of the memory 604, the data store 618, or both (illustrated in FIG. 6) can be realized by the one or more data stores 1015. The one or more data store 1015 can include volatile memory and/or non-volatile memory. Examples of suitable memory for the one or more data stores 1015 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1015 can be a component of the one or more processors 1010. Additionally or alternatively, the one or more data stores 1015 can be operatively connected to the one or more processors 1010 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1015 can store map data 1016. The map data 1016 can include maps of one or more geographic areas. In some instances, the map data 1016 can include information or data on roads, traffic control devices, road markings, structures, features, and/or landmarks in the one or more geographic areas. The map data 1016 can be in any suitable form. In some instances, the map data 1016 can include aerial views of an area. In some instances, the map data 1016 can include ground views of an area, including 360-degree ground views. The map data 1016 can include measurements, dimensions, distances, and/or information for one or more items included in the map data 1016 and/or relative to other items included in the map data 1016. The map data 1016 can include a digital map with information about road geometry. The map data 1016 can be high quality and/or highly detailed.

In one or more arrangements, the map data 1016 can include one or more terrain maps 1017. The one or more terrain maps 1017 can include information about the ground, terrain, roads, surfaces, and/or other features of one or more geographic areas. The one or more terrain maps 1017 can include elevation data of the one or more geographic areas. The map data 1016 can be high quality and/or highly detailed. The one or more terrain maps 1017 can define one or more ground surfaces, which can include paved roads, unpaved roads, land, and other things that define a ground surface.

In one or more arrangements, the map data 1016 can include one or more static obstacle maps 1018. The one or more static obstacle maps 1018 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1018 can have location data, size data, dimension data, material data, and/or other data associated with them. The one or more static obstacle maps 1018 can include measurements, dimensions, distances, and/or information for one or more static obstacles. The one or more static obstacle maps 1018 can be high quality and/or highly detailed. The one or more static obstacle maps 1018 can be updated to reflect changes within a mapped area.

In one or more arrangements, the one or more data stores 1015 can store sensor data 1019. As used herein, "sensor data" can refer to any information about the sensors with which the vehicle 1000 can be equipped including the capabilities of and other information about such sensors. The sensor data 1019 can relate to one or more sensors of the sensor system 1020. For example, in one or more arrangements, the sensor data 1019 can include information about one or more lidar sensors 1024 of the sensor system 1020.

In some arrangements, at least a portion of the map data 1016 and/or the sensor data 1019 can be located in one or more data stores 1015 that are located onboard the vehicle 1000. Alternatively or additionally, at least a portion of the map data 1016 and/or the sensor data 1019 can be located in one or more data stores 1015 that are located remotely from the vehicle 1000.

The sensor system 1020 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 1020 includes a plurality of sensors, the sensors can work independently from each other. Alternatively, two or more of the sensors can work in combination with each other. In such a case, the two or more sensors can form a sensor network. The sensor system 1020 and/or the one or more sensors can be operatively connected to the one or more processors 1010, the one or more data stores 1015, and/or another element of the vehicle 1000 (including any of the elements illustrated in FIG. 10). The sensor system 1020 can acquire data of at least a portion of the external environment of the vehicle 1000 (e.g., nearby vehicles). The sensor system 1020 can include any suitable type of sensor. Various examples of different types of sensors are described herein. However, one of skill in the art understands that the embodiments are not limited to the particular sensors described herein.

The sensor system 1020 can include one or more vehicle sensors 1021. The one or more vehicle sensors 1021 can detect, determine, and/or sense information about the vehicle 1000 itself. In one or more arrangements, the one or more vehicle sensors 1021 can be configured to detect and/or sense position and orientation changes of the vehicle 1000 such as, for example, based on inertial acceleration. In one or more arrangements, the one or more vehicle sensors 1021 can include one or more accelerometers, one or more gyroscopes, an inertial measurement unit (IMU), a dead-reckoning system, a global navigation satellite system (GNSS), a global positioning system (GPS), a navigation system 1047, and/or other suitable sensors. The one or more vehicle sensors 1021 can be configured to detect and/or sense one or more characteristics of the vehicle 1000. In one or more arrangements, the one or more vehicle sensors 1021 can include a speedometer to determine a current speed of the vehicle 1000.

Alternatively or additionally, the sensor system 1020 can include one or more environment sensors 1022 configured to acquire and/or sense driving environment data. As used herein, "driving environment data" can include data or information about the external environment in which a vehicle is located or one or more portions thereof. For example, the one or more environment sensors 1022 can be configured to detect, quantify, and/or sense obstacles in at least a portion of the external environment of the vehicle 1000 and/or information/data about such obstacles. Such obstacles may be stationary objects and/or dynamic objects. The one or more environment sensors 1022 can be configured to detect, measure, quantify, and/or sense other things in the external environment of the vehicle 1000 such as, for example, lane markers, signs, traffic lights, traffic signs, lane lines, crosswalks, curbs proximate the vehicle 1000, off-road objects, etc.

Various examples of sensors of the sensor system 1020 are described herein. The example sensors may be part of the one or more vehicle sensors 1021 and/or the one or more environment sensors 1022. However, one of skill in the art understands that the embodiments are not limited to the particular sensors described.

In one or more arrangements, the one or more environment sensors 1022 can include one or more radar sensors 1023, one or more lidar sensors 1024, one or more sonar sensors 1025, and/or one or more cameras 1026. In one or more arrangements, the one or more cameras 1026 can be one or more high dynamic range (HDR) cameras or one or more infrared (IR) cameras. For example, the one or more cameras 1026 can be used to record the reality of a state of an item of information that can appear in the digital map. For example, functions and/or operations of the lidar device 616 (illustrated in FIG. 6) can be realized by the one or more lidar sensors 1024. For example, functions and/or operations of the camera 614 (illustrated in FIG. 6) can be realized by the one or more cameras 1026.

The input system 1030 can include any device, component, system, element, arrangement, or groups thereof that enable information/data to be entered into a machine. The input system 1030 can receive an input from a vehicle passenger (e.g., a driver or a passenger). The output system 1035 can include any device, component, system, element, arrangement, or groups thereof that enable information/data to be presented to a vehicle passenger (e.g., a driver or a passenger).

Various examples of the one or more vehicle systems 1040 are illustrated in FIG. 10. However, one of skill in the art understands that the vehicle 1000 can include more, fewer, or different vehicle systems. Although particular vehicle systems can be separately defined, each or any of the systems or portions thereof may be otherwise combined or segregated via hardware and/or software within the vehicle 1000. For example, the one or more vehicle systems 1040 can include a propulsion system 1041, a braking system 1042, a steering system 1043, a throttle system 1044, a transmission system 1045, a signaling system 1046, and/or the navigation system 1047. Each of these systems can include one or more devices, components, and/or a combination thereof, now known or later developed.

The navigation system 1047 can include one or more devices, applications, and/or combinations thereof, now known or later developed, configured to determine the geographic location of the vehicle 1000 and/or to determine a travel route for the vehicle 1000. The navigation system 1047 can include one or more mapping applications to determine a travel route for the vehicle 1000. The navigation system 1047 can include a global positioning system, a local positioning system, a geolocation system, and/or a combination thereof.

The one or more actuators 1050 can be any element or combination of elements operable to modify, adjust, and/or alter one or more of the vehicle systems 1040 or components thereof responsive to receiving signals or other inputs from the one or more processors 1010 and/or the one or more automated driving modules 1060. Any suitable actuator can be used. For example, the one or more actuators 1050 can include motors, pneumatic actuators, hydraulic pistons, relays, solenoids, and/or piezoelectric actuators.

The one or more processors 1010 and/or the one or more automated driving modules 1060 can be operatively connected to communicate with the various vehicle systems 1040 and/or individual components thereof. For example, the one or more processors 1010 and/or the one or more automated driving modules 1060 can be in communication to send and/or receive information from the various vehicle systems 1040 to control the movement, speed, maneuvering, heading, direction, etc. of the vehicle 1000. The one or more processors 1010 and/or the one or more automated driving modules 1060 may control some or all of these vehicle systems 1040 and, thus, may be partially or fully automated.

The one or more processors 1010 and/or the one or more automated driving modules 1060 may be operable to control the navigation and/or maneuvering of the vehicle 1000 by controlling one or more of the vehicle systems 1040 and/or components thereof. For example, when operating in an automated mode, the one or more processors 1010 and/or the one or more automated driving modules 1060 can control the direction and/or speed of the vehicle 1000. The one or more processors 1010 and/or the one or more automated driving modules 1060 can cause the vehicle 1000 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 1070 can include one or more receivers 1071 and/or one or more transmitters 1072. The communications system 1070 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 1070 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 612 (illustrated in FIG. 6) can be realized by the communications system 1070.

The vehicle 1000 can include one or more modules, at least some of which are described herein. The modules can be implemented as computer-readable program code that, when executed by the one or more processors 1010, implement one or more of the various processes described herein. One or more of the modules can be a component of the one or more processors 1010. Alternatively or additionally, one or more of the modules can be executed on and/or distributed among other processing systems to which the one or more processors 1010 can be operatively connected. The modules can include instructions (e.g., program logic) executable by the one or more processors 1010. Alternatively or additionally, the one or more data store 1015 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 1000 can include one or more automated driving modules 1060. The one or more automated driving modules 1060 can be configured to receive data from the sensor system 1020 and/or any other type of system capable of capturing information relating to the vehicle 1000 and/or the external environment of the vehicle 1000. In one or more arrangements, the one or more automated driving modules 1060 can use such data to generate one or more driving scene models. The one or more automated driving modules 1060 can determine position and velocity of the vehicle 1000. The one or more automated driving modules 1060 can determine the location of obstacles, obstacles, or other environmental features including traffic signs, trees, shrubs, neighboring vehicles, pedestrians, etc.

The one or more automated driving modules 1060 can be configured to receive and/or determine location information for obstacles within the external environment of the vehicle 1000 for use by the one or more processors 1010 and/or one or more of the modules described herein to estimate position and orientation of the vehicle 1000, vehicle position in global coordinates based on signals from a plurality of satellites, or any other data and/or signals that could be used to determine the current state of the vehicle 1000 or determine the position of the vehicle 1000 with respect to its environment for use in either creating a map or determining the position of the vehicle 1000 in respect to map data.

The one or more automated driving modules 1060 can be configured to determine one or more travel paths, current automated driving maneuvers for the vehicle 1000, future automated driving maneuvers and/or modifications to current automated driving maneuvers based on data acquired by the sensor system 1020, driving scene models, and/or data from any other suitable source such as determinations from the sensor data 1019. As used herein, "driving maneuver" can refer to one or more actions that affect the movement of a vehicle. Examples of driving maneuvers include: accelerating, decelerating, braking, turning, moving in a lateral direction of the vehicle 1000, changing travel lanes, merging into a travel lane, and/or reversing, just to name a few possibilities. The one or more automated driving modules 1060 can be configured to implement determined driving maneuvers. The one or more automated driving modules 1060 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 1060 can be configured to execute various vehicle functions and/or to transmit data to, receive data from, interact with, and/or control the vehicle 1000 or one or more systems thereof (e.g., one or more of vehicle systems 1040). For example, functions and/or operations of an automotive navigation system can be realized by the one or more automated driving modules 1060.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, 5A, 5B, 6-8, 9A, 9B, and 10, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for detecting an object in an environment, the system comprising:
   one or more processors; and
   a memory communicably coupled to the one or more processors and storing:
      a feature extraction module including instructions that when executed by the one or more processors cause the one or more processors to:
         obtain a point cloud data set augmented with semantic information associated with identities of classes of objects; and
         extract features from the point cloud data set;
      a feature map production module including instructions that when executed by the one or more processors cause the one or more processors to:
         produce, based on the features, an initial bird's eye view feature map; and
         augment the initial bird's eye view feature map with the semantic information to produce an augmented bird's eye view feature map; and
      an object detection module including instructions that when executed by the one or more processors cause the one or more processors to detect, based on the augmented bird's eye view feature map, the object in the environment.

2. The system of claim 1, wherein the system is disposed in an autonomous mobile agent.

3. The system of claim 2, wherein the autonomous mobile agent comprises an autonomous vehicle.

4. The system of claim 2, wherein the autonomous mobile agent comprises a mobile robot.

5. The system of claim 1, further comprising a data store communicably coupled to the one or more processors and configured to store at least one of the point cloud data set, the initial bird's eye view feature map, or the augmented bird's eye view feature map.

6. The system of claim 1, wherein at least one of the instructions to extract the features from the point cloud data set or the instructions to produce the initial bird's eye view feature map include instructions that cause the one or more processors to perform operations on data in the point cloud data set that have an effect of diminishing an ability to distinguish the semantic information in data for the initial bird's eye view feature map.

7. The system of claim 1, further comprising a communications device communicably coupled to the one or more processors, wherein the instructions to obtain the point cloud data set include instructions that cause the one or more processors to receive, via the communications device, the point cloud data set.

8. The system of claim 1, wherein the instructions to obtain the point cloud data set include instructions that cause the one or more processors to:
   obtain a two-dimensional image of the object in the environment;
   segment the two-dimensional image to produce the semantic information;
   obtain an initial point cloud data set that corresponds to the two-dimensional image; and
   map the semantic information to points of the initial point cloud data set to produce the point cloud data set augmented with the semantic information.

9. The system of claim 8, further comprising a camera configured to produce the two-dimensional image.

10. The system of claim 8, further comprising a lidar device configured to produce the initial point cloud data set.

11. The system of claim 8, further comprising a data store communicably coupled to the one or more processors and configured to store at least one of the two-dimensional image or the initial point cloud data set.

12. The system of claim 8, wherein the instructions to obtain the point cloud data set further include instructions that cause the one or more processors to correct a misalignment between the two-dimensional image and the initial point cloud data set.

13. The system of claim 12, wherein the misalignment is due to at least one of:
   parallax between a device that produced the two-dimensional image and a device that produced the initial point cloud data set, or
   a miscalibration between the device that produced the two-dimensional image and the device that produced the initial point cloud data set.

14. The system of claim 1, wherein the instructions to extract the features from the point cloud data set include instructions that cause the one or more processors to:
   determine a width of the point cloud data set, a depth of the point cloud data set, and a height of the point cloud data set;
   discretize the point cloud data set into cells delineated by a grid defined with respect to the width and the depth; and
   operate a two-dimensional convolutional neural network to process the cells.

15. The system of claim 14, wherein:
   the semantic information comprises probability distributions of predictions of the identities of the classes of objects, and
   the semantic information is averaged over at least some of the cells.

16. The system of claim 1, wherein at least one of the instructions to obtain the point cloud data set, the instructions to extract the features, the instructions to produce the initial bird's eye view feature map, the instructions to augment the initial bird's eye view feature map, or the instructions to detect the object in the environment include instructions that cause the one or more processors to operate a neural network.

17. A method for detecting an object in an environment, the method comprising:
   obtaining, by a processor, a point cloud data set augmented with semantic information associated with identities of classes of objects;
   extracting, by the processor, features from the point cloud data set;
   producing, by the processor and based on the features, an initial bird's eye view feature map;
   augmenting, by the processor, the initial bird's eye view feature map with the semantic information to produce an augmented bird's eye view feature map; and detecting, by the processor and based on the augmented bird's eye view feature map, the object in the environment.

18. The method of claim 17, wherein the semantic information comprises probability distributions of predictions of the identities of the classes of objects.

19. The method of claim 17, wherein the semantic information includes:
   a first color for a first class of the classes of objects, and
   a second color for a second class of the classes of objects.

20. A non-transitory computer-readable storage medium for detecting an object in an environment, the non-transitory computer-readable storage medium including instructions that when executed by one or more processors cause the one or more processors to:
   obtain a point cloud data set augmented with semantic information associated with identities of classes of objects;
   extract features from the point cloud data set;
   produce, based on the features, an initial bird's eye view feature map;
   augment the initial bird's eye view feature map with the semantic information to produce an augmented bird's eye view feature map; and
   detect, based on the augmented bird's eye view feature map, the object in the environment.

* * * * *